April 16, 1963  E. J. ARCHER  3,085,353
TEACHING MACHINE
Filed Feb. 10, 1960

INVENTOR
E. J. Archer
BY Adams, Forward & McLean
ATTORNEYS 3,085,353
TEACHING MACHINE
Edward James Archer, Madison, Wis., assignor to Wisconsin Alumni Research Foundation, Madison, Wis., a corporation of Wisconsin
Filed Feb. 10, 1960, Ser. No. 7,856
1 Claim. (Cl. 35—9)

This invention is a novel device for use in teaching. It is of simpler and more compact construction than other teaching aids of this type, and therefore can be manufactured at relatively low cost. In addition this invention provides a teaching aid which is easier to use than other devices heretofore proposed, which makes maximum use of each refilling of the device, and which provides for quick preparation of forms by the teacher himself for use in the device.

The device is designed to present programmed teaching materials in a series of questions and answers. The steps in the program would be so small as to assure the student's making the correct responses most of the time. In this way a student could learn materials under nearly ideal conditions of optimal rate, immediate feedback, appropriate reward and no punishment.

An example of such programming would be a lesson which uses the question-answer or Socratic method of teaching. This method is an alternative to the lecture method of teaching where the pupil is presented with a series of facts with or without conclusions to be drawn from the facts. In the Socratic method the student is presented by the teacher with a question which the student must ponder before giving a one-word answer, frequently a simple "yes" or "no," the answer usually being induced by drawing upon the common experiences of mankind aided by formal logic, intuition or common sense. The questions, in this method, are so presented that there is but one logical answer although sometimes there is a choice of synonyms. The conclusion which the student is forced to come to by the first question is used as a basis for the second question, which again has an unequivocal short answer. In this way the student is led, by a long series of questions, finally to come to a conclusion which logically follows from the original premises, or to an understanding of a principle, without finding himself confused or in a logical impasse or dilemma.

The device of the invention may be used by the student without the aid of a teacher, for example, for purposes of review. The device uses a form in which each question and its answer are contiguous; therefore the form may be easily prepared without the use of an elaborate template. Ordinary paper may be cut to the proper size and used as the form, and questions and answers may be printed, typewritten or handwritten on one or both sides of the form.

The device comprises a flat rotating mount for a form containing questions and answers, means to cover most of the form having a single opening for viewing an uncovered section of the form and an instrument to rotate the mount and uncover an answer. Preferably the single opening leaves uncovered a question with its own answer and the means to cover the form includes a moveable mask for the part of the form containing the answer. In this embodiment the rotation instrument is a single means which both moves the mask to expose the answer and rotates the mount. When there is no separate moveable mask, the single opening exposes to view a question along with the answer to the previous question.

The device will be better understood by reference to the accompanying drawing in which.

Figure 1:
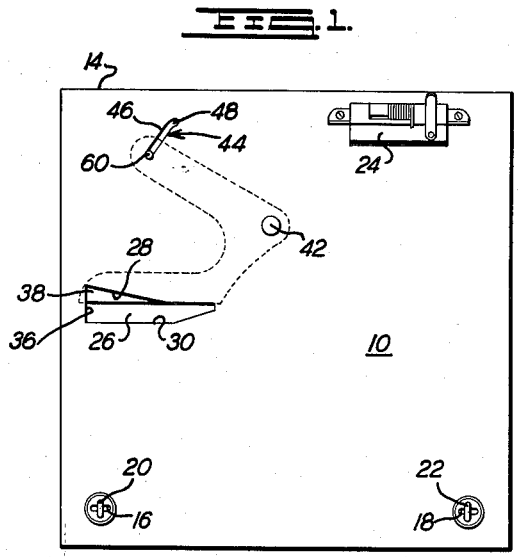
FIGURE 1 represents the cover of a preferred embodiment of the device in its closed or operating position.
Figure 2:
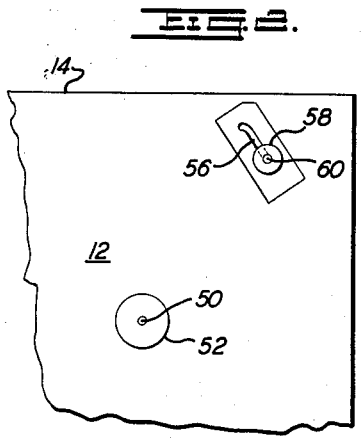
FIGURE 2 shows a fragmentary view of the back of this preferred embodiment.
Figure 3:
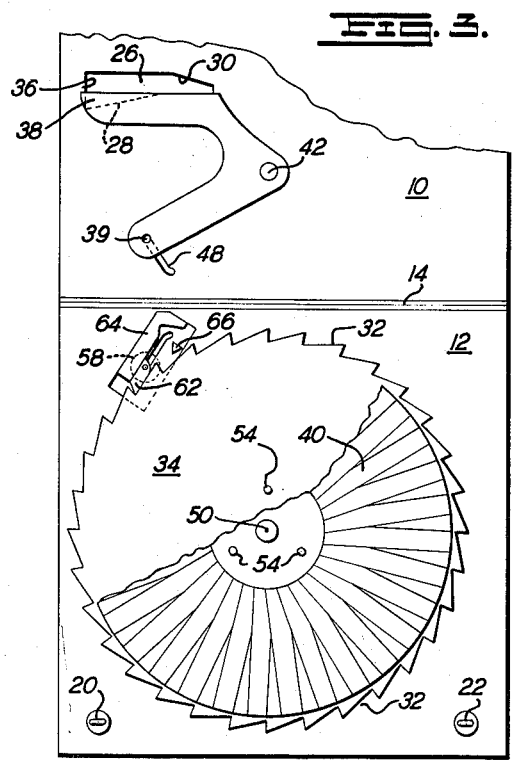
FIGURE 3 is a fragmentary view of the interior of the device in its open position, in which state forms may be removed and replaced, and showing a form partly torn away.

The device is preferably in the form of a book having a front cover 10 and a back cover 12 joined by the seam 14. The front cover may be provided with openings 16, 18 for the introduction of fasteners 20 and 22 which are conveniently mounted on the inside of the back cover 12. Alternatively, the front and back covers may be completely separate with a fastener being substituted for the seam 14. Front cover 10 may also bear auxiliary members, such as a clip 24 for holding the student's answer tablet, etc., during the teaching session.

The front cover 10 contains the viewing aperture 26 which is of elongated form and which has an upper edge 28 and a lower edge 30 which define the area within which the question and answer appear when the device of the invention is closed. In operating position the long dimension of the aperture is horizontal and the device may be held with the aperture to the left or right of the device. Preferably the front and back covers 10 and 12 are square and are of a size big enough to circumscribe the circle defined by the outer edges of the teeth 32 of the gear 34. The upper and lower edges 28 and 30 of the aperture 26 preferably coincide with radii of the abovementioned circle. Outer edge 36 of aperture 26 is preferably located sufficiently inboard of the edge of front cover 10 so that the gear teeth do not show when the covers are closed.

Pivotally mounted on the inside of front cover 10 is the mask 38 which has the hole 39, which serves visually to close part-way the aperture 26. Thus when the question-answer form 40 is mounted on the gear the mask hides the answer to the question visible through the aperture 26. The mask may be mounted, for example, by means of rivet 42. Front cover 10 also is pierced by the slot 44 which preferably has a straight portion 46 and an arcuate portion 48. The arcuate portion is situated nearer to the seam 14 than the straight portion.

Gear 34 is revolvably mounted on the back cover 12, for example, by means of the shaft 50 which is fastened to the back cover by the washer 52. The gear may contain one or more projections 54 designed to fit into holes in the form 40 to rotate the form when the gear is rotated.

The back cover is pierced by the slot 56 which is congruent with the slot 44. Slots 44 and 56 are arranged on their respective covers in such position that they are totally aligned with each other when the device is closed. A single instrument operates both the rotation of the gear 34 and the oscillation of the mask 38. This instrument comprises the handle 58 which is mounted on shaft 60 preferably behind the back cover. Shaft 60 passes through the slot 56, loosely holds the ratchet 62 and is long enough to pass through the hole 39 in mask 38 and through slot 44 when the device is closed. Alternatively the handle may be mounted on shaft 60 forward of the front cover. In this embodiment the shaft holds the mask 38 and ratchet 62 and passes through slot 56 when the device is closed. Mounted on the inside of the back cover are the guide rail 64, which in the preferred embodiment is an L-shaped member, and the stop 66. The guide rail 64 and stop 66 prevent rotation of the ratchet 62 on the shaft 60. Ratchet 62 may be spring-biased toward the gear 34, but this is usually not necessary when the handle 58 is directly mounted on the shaft 60 as illustrated.

In operation, a preferably circular paper form is used having questions and answers written on it in such manner that each question and answer occupy an amount of space the size and shape of the aperture 26. The answer to the question is placed adjacent and above the question, in the space covered by the mask 38, when the device includes the movable mask and the aperture is held at the left side of the device. The answer is placed below the question when no mask is used. Since the device may be designed to rotate the gear one tooth at a time, the form may contain as many questions and answers as there are teeth on the gear 34. Also one or more of the spaces may be used for instructions, rather than questions and answers. The number of teeth also determines the angle between the upper and lower edges of the aperture 26. For example, where a gear is used containing thirty teeth, thirty questions and answers may be put on each side of the form and the angle between edges 28 and 30 will be 12° (360° divided by thirty). The form may be perforated for reception of the projections 54, or these projections may themselves cause the perforations when the form is mounted.

The form 40 is placed on the gear 34 and the front cover 10 is placed over the back cover 12 in such a manner that the shaft 60 penetrates the hole 39 and the slot 44 and the fasteners 20 and 22 pass through the openings 16 and 18, respectively. The fasteners are put into operative position and the lesson may proceed with the shaft 60 at the end of the straight portion of slots 44 and 56, at which time the ratchet is in the position shown in FIGURE 4 by solid lines. A question appears in the aperture 26 but its answer is hidden by the mask 38. When the question has been decided the handle 58 is drawn toward the arcuate end of the slots 44 and 56, oscillating the mask 38 and uncovering the answer.

Figure 4:
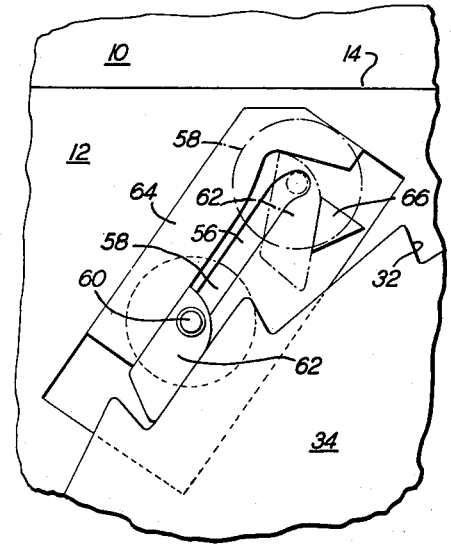
FIGURE 4 is a detailed view of the gear rotation instrument showing the beginning and end positions of the ratchet.

While the answer is being uncovered, ratchet 62 is drawn along the guide rail 64 and when the shaft 60 reaches the arcuate portion of slot 56, the guide-rail causes a slight rotation of the ratchet to contact stop 66, and aim the ratchet at the next gear tooth, as shown by the dashed lines in FIGURE 4. The next question is brought into view by movement of the handle 58 toward the straight portion of the slots 44 and 56. Movement of the shaft 60 causes the ratchet 62 to mesh with a gear tooth 32 rotating the gear 34 and oscillating the mask 38 to cover the answer of the newly exposed question. During the return of shaft 60 to the arcuate end of the slots the ratchet 62 merely slips along the edge of the gear tooth 32. On each movement of the handle the ratchet is preferably engaged with the next gear adjacent to the one previously enmeshed.

The device of this invention may be made of any suitable materials—metal, plastic, wood or cardboard, or combinations of these materials, any or all of which can be painted or covered with suitable textile or other materials as desired. Also the edges of the covers 10 and 12 may be raised to hide the interior members and provide for a neat appearance.

I claim:

A device for use in teaching which comprises a front and back cover hingedly connected, a flat rotating ratchet wheel supported internally by said back cover, a flat question-and-answer form removably affixed to said ratchet wheel and having each answer contiguous to its appropriate question, said front cover having a single opening for viewing a single question-and-answer section of the form, movable means supported internally on said front cover and cooperating with said opening to mask a part of said section containing the answer, a ratchet supported for reciprocation internally on said back cover and including a shaft registering with a hole in the masking means and slots in said covers, said shaft forming a handle on one side of said front cover, said ratchet meshing with a tooth of the said ratchet wheel, succeeding movements of said handle in the same plane as the ratchet wheel causing meshing of the ratchet with adjacent teeth of the ratchet wheel, rotation of the ratchet wheel, and movement of the mask.

References Cited in the file of this patent

UNITED STATES PATENTS

| | | |
|---|---|---|
| 2,336,742 | Maguire | Dec. 14, 1943 |
| 2,546,789 | Schielke | Mar. 27, 1951 |
| 2,924,025 | Salisbury | Feb. 9, 1960 |
| 2,987,828 | Skinner | June 13, 1961 |